March 27, 1945. A. W. KOON 2,372,433
MOLDABLE PLASTICS COMPOSITION AND METHOD OF PREPARING SAME
Filed April 18, 1941
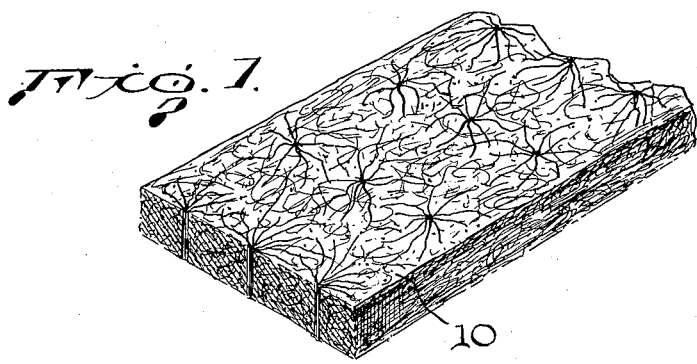
Fig. 1.
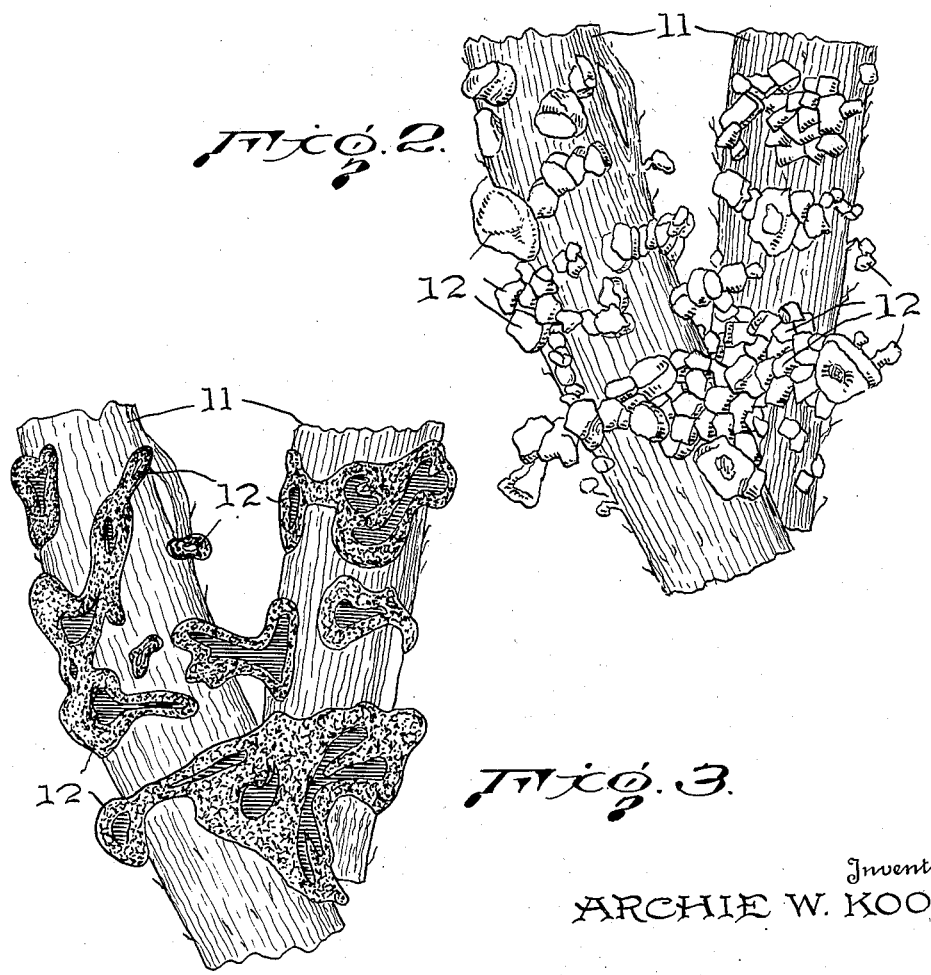
Fig. 2.
Fig. 3.
Inventor
ARCHIE W. KOON
By Church & Church
his Attorneys Patented Mar. 27, 1945

2,372,433

UNITED STATES PATENT OFFICE 2,372,433

MOLDABLE PLASTICS COMPOSITION AND METHOD OF PREPARING SAME

Archie W. Koon, Auburn, N. Y., assignor to Columbian Rope Company, Auburn, N. Y., a corporation of New York Application April 18, 1941, Serial No. 389,234

4 Claims. (Cl. 28—73)

This invention relates to the molded plastics art and particularly to a method of preparing a moldable plastics composition and the product molded with that composition. In the development of molded plastics it has become common practice to use a, so-called, filler in the molded product or article for increasing the strength and impact resistance of the latter. Plastics, such as phenolic or amino condensations products and cellulose derivatives and vinyl compounds known as thermo-setting and thermo-plastic binders, respectively, are quite brittle and shatter very easily when molded without having incorporated therein additional strength-imparting materials, and, as a result, different types of fillers have been adopted. One form of filler, in granular form, known as wood filler, has been used, but higher-than-ordinary strength and impact resistance is obtained in molded articles where fibrous materials in coherent bodies have been used. In combining the filler and binder it has been deemed essential that the binder be uniformly and intimately associated with the filler material, and, while this can be readily accomplished with fillers of granular form, such results are quite difficult, if not impossible, where coherent bodies of fibrous materials are used, due to the methods used in fabricating the coherent bodies of filler materials known in the prior art. For instance, spinning and weaving of the fibers and threads, respectively, in the case of canvas materials, and the felting of the fibers, in the case of water-laid paper, causes the fibers to be so densely compacted in the fabricated, coherent body, that it has been customary to prepare the binder in solution form for impregnation or treatment of the canvas, paper, or other coherent filler body. However, the use of the binder in solution form is disadvantageous in several respects. For instance, the solvent is expensive, and likewise, the apparatus used for the recovery of the solvent is costly and requires additional expenditures for labor in the operation thereof. Again, the use of a binder in solution form renders it necessary to heat-treat the impregnated filler to dry the treated material, so that, usually, the treated filler material or moldable composition cannot be actually molded until twenty-four hours or more after its treatment with the binder solution.

I have discovered that certain types of coherent filler bodies may be combined with these plastics binders while the binder is in a dry, pulverized form, and the primary object of this invention is to provide a method of preparing the composition of binder and filler wherein the use of a solvent for the binder is eliminated and the binder applied in dry form to the filler, without sacrificing strength in the finished molded product.

Still another object of the invention is to provide a method of preparing the composition of binder and filler whereby the entry of the binder in powdered form into the coherent body of filler material can be limited to superficial areas, so that, upon being molded, the interior portions of the coherent body of filler will consist of substantially unbonded fibers enveloped in the molded plastics binder, thus imparting comparatively high resiliency to the finished molded product.

Another object of the present invention is to produce a molded article formed essentially of a coherent body of filler elements and a binder of the type described, wherein, as before pointed out, the filler elements in the interior of the molded article are substantially unbonded with respect to one another, but are enveloped in the molded plastics casing or shell, thus increasing the resiliency of the article.

Figure 1 is a perspective view of a section of a sheet of the filler material for the moldable composition of the present invention;

Fig. 2 is a diagrammatical illustration, on an enlarged scale, illustrating two fibers with particles of unadvanced binder material associated therewith.

Fig. 3 is a similar view showing the binder particles fluxed or advanced for attachment to the fibers.

In the preferred method of practicing the present invention vegetable fibers usually running three or four feet in length are passed through the ordinary carding machine used in the preparation rooms of vegetable fiber twine factories, which breaks the fibers into shorter lengths and the latter are discharged from the carding machine in a substantially unstable web, with the fibers running approximately twelve inches in length. This web is said to be substantially unstable because it will not support its own weight, the individual lengths of fibers being very loosely associated one with the other. This unsubstantial web of fibers is then passed through a lapper and then through a, so-called, needle loom, well known in the textile industry, wherein a plurality of barbed needles are advanced and retracted through the web of fibers. The barbs on the needles catch groups of the fibers when the needles are moved in one direction and cause these groups or tufts of fibers to become arranged transversely of the web where they remain when the needles are retracted. Thus, the web of comparatively long fibers is stabilized or rendered coherent, but, in subjecting the web to the action of the needle loom, care should be taken to see that the fibers are not too densely compacted. In other words, it is intended that the needled web, having the tufts or groups of fibers projecting therethrough, shall have substantially continuous channels formed therein, or, as might be described, the needled web is more or less honeycombed with these channels or ducts. Due to the fact that the needled fibers in the needled web are only loosely compacted or associated, notwithstanding the fact that they constitute a coherent body by the interlacing effect of the groups or tufts of fibers, it is not necessary to use a binder in solution form in preparing the present moldable composition. As pointed out, the binder is combined with the filler in dry, powdered or pulverized form, the size of the particles compared with that of the channels in the needled web being such that the particles can readily enter the web. The pulverized, dry binder can be combined with the fiber filler body in various ways. In the preferred method, a phenol formaldehyde condensation product, in dry form and usually advanced to what is termed in the industry the "B" stage, is used. This powdered binder may be sprinkled or spread on the surface or surfaces of the web of fibers and distribution of the binder may be improved by squeezing or beating or vibrating the web. Entirely uniform and complete distribution is not always required because flow of the binder under the heat and pressure used in the molding step may obviate this need. If desired, the binder in powdered form may be tumbled with sections or pieces of the fiber or filler web in a rotating barrel or similar container until the binder is distributed throughout the filler. In carrying out this practice, it may be found that an excessive quantity of the binder will become embedded in the coherent body of fibers. Under these circumstances, the excess may be readily removed by shaking or vibrating the filler body.

In some instances, it may be found that the structural characteristics of the web of fibers and the character of the powdered binder material are such that subsequent handling of the moldable composition dislodges some of the binder. Various means for augmenting retention of the binder in the coherent body of fibers may be used. For instance, the needled web of fibers may be made quite thick, or fibrous elements having comparatively rough surfaces may be used. Preferably, however, the temperature of the moldable composition, consisting of the dry, powdered binder and web of fibers, is raised to the fluxing stage of the binder, whereby the latter will become tacky and firmly adhere or become attached to the fibrous elements of the web. Finally, if desired, the surfaces of the fibrous elements of the web may be treated to render them tacky. Mucilaginous or adhesive substances may be used to accomplish this purpose. Specific examples of such materials are starch and glue, or natural or synthetic resins. Oils, tars, and dispersions of rubber or other elastomers may be used. Also, the fibers may be dampened with liquids which are solvents for the resinous binder, alcohol or acetone being preferred in the application of phenolic resins. The accompanying drawing illustrates, in Fig. 1, a body 10 of the filler material prior to the application of the powdered binder. Fig. 2 shows two fibers 11 and particles 12 of the binder associated therewith prior to the fluxing of the binder, and Fig. 3 illustrates the particles 12 after the fluxing of the binder.

Where it is desired to produce a molded article possessing inherent resiliency, the treatment of the coherent body of fibers with the dry, powdered binder should be such as to limit entry of the binder particles to the channels in the body of fibers, or, in other words, the application of the binder to the web of fibers should be such that the binder particles do not gain access to the innermost portions of the web. With compositions of this type molding of the material under proper heat and pressure will produce an article that might be described as consisting of a shell of reinforced molded plastics enveloping a substantially unbonded mass of fibers in the interior thereof.

Preferably, the coherent body of filler material consists of the needled web of fibers as described, but it will be appreciated that these plastics binders in dry, pulverized form may also be used with other types of coherent filler bodies, provided two conditions are met, i. e., first, that the sheet, web or other body be sufficiently honeycombed by continuous channels as to permit ready access of the binder to all parts or portions thereof, and, secondly, that the ports or channels, while sufficiently coarse to meet the first requirement are, nevertheless, minute enough to hold the binder particles against easy dislodgment. However, as previously described, the present method may be varied for augmenting the retention of the binder particles as by fluxing the binder particles after they have infiltrated into the coherent body of filler.

By the use of the present method of preparing the moldable composition, not only is the cost of solvent eliminated, but health and fire hazards incurred by the use of solvent are avoided. Again, the mats or webs or other coherent bodies of filler material are combined with the binder without any distortion such as frequently accompanies the squeezing operations characteristically resorted to for removing excess binder solution. Also, as previously pointed out, the time element and the cost involved in connection with the removal of solvent are also obviated. Besides these operating conveniences and economies, the present method of preparing the moldable composition gives rise to the novel product, wherein the substantially unbonded mass of filler fibers are encased or sheathed by the shell of molded ingredients. Tests also indicate that where the binder is introduced in powdered form, the impact resistance of the molded article or product may be doubled. As an example, a moldable composition of needled sisal fiber and phenolic resin, with the latter applied as an alcoholic solution, was molded and the product had a Charpy impact test of six foot pounds per inch of notch; whereas, when the same resin binder was aplied to the same filler material in dry, powdered form, the Charpy impact tests made under identical conditions was twelve foot pounds per inch of notch. The complete explanation of this improvement or increase in strength, due to the use of the binder in dry, powdered form, is not apparent, but it is believed to be due in part to a changed relationship between the fibers of the filler and the binder material in the finished molded product. That is, the binder applied in powdered form forms a continuous network through the molded body, as is usual, but the fibers themselves are but little penetrated or modified, and so retain more fully their characteristic stamina or reinforcing properties.

It will be understood that, after the fibrous elements constituting the filler have been subjected to the action of the carding machine and to that of the needle loom, and the binder has been incorporated in the coherent body of loosely compacted fibers, the moldable composition thus produced is introduced into a mold of desired shape or between platens and molded under heat and pressure, this molding operation, including the usual laminating steps, being carried out in the conventional manner well known in plastics molding art today.

While sisal fibers have been expressly referred to, it will be appreciated that other types of filamentary elements of vegetable or non-vegetable origin may be utilized in lieu thereof. Likewise, various binders may be used. Phenolic and amino condensation products have been referred to as representing that class of plastics binders commonly referred to as thermo-setting, but suitable thermoplastic binders, as exemplified by vinyl or vinylidene polymers, cellulose esters or ethers, or by various natural and synthetic resins, may also be used. It is only essential that the plastics exhibit the desired binding and molding properties and that they be obtainable in dry, powdered form.

It will be appreciated that the use of the binder in dry, powdered form does not necessarily prohibit the application of binder in solution to the web of filler also. For instance, the web can be given a preliminary application of binder in solution and the dry, powdered binder dusted on later to produce a heavier resinous skin or coating at the surface and, consequently, a better exterior finish on the molded article. Also, laminations of filler treated solely with binder in solution can be plied between laminations to which the dry, powdered binder is applied to produce the heavier coating and better exterior finish.

Where resiliency is desired in the molded article, good results have been obtained by using a so-called, hard fiber filler, for instance, a needled web of sisal fibers in conjunction with the dry, powdered binder. The structure of these hard fibers is such that they will not mold to high density under pressure. Hence, they tend to form a springy or resilient mass, and, when the dry binder is used with these hard fibers, it is possible to limit penetration of the fiber mass by the powdered material and thus rather accurately control the resiliency inherent in the molded body.

What I claim is:

1. A moldable plastics composition consisting of a web-like body of comparatively long vegetable fibers having groups of the fibers projecting therethrough to interlace the fibers of the web, said interlaced fibers consisting of a coherent but loosely compacted body with substantially continuous channels extending therethrough, and a thermo-responsive resin binder distributed in said channels, said binder being in dry, powdered form with the particles partially advanced and attached to the fibers in said body.

2. A moldable plastics composition consisting of a web-like body of comparatively long filamentary elements with groups of said elements interlacing the elements into a coherent but loosely compacted body having substantially continuous channels in the interior thereof, and a thermo-responsive resin binder distributed in said channels and attached to said elements in a partially advanced, dry, powdered form.

3. The method of preparing a moldable plastic composition which consists in forming comparatively long vegetable fibers into a web-like body, projecting groups of the fibers through the web to loosely interlace the fibers of the web into a coherent but loosely compacted body with substantially continuous channels extending through the web-like body, applying to the surface of said body and introducing into said channels a resinous binder in dry, powdered form and temporarily raising the powdered binder to fluxing temperature to soften and attach the binder particles to the fibers and retain the binder in the channels whereby said binder material will not be dislodged during subsequent handling of the composition prior to molding.

4. The method of preparing a moldable plastics composition which consists in forming comparatively long vegetable fibers into a web-like body, projecting groups of the fibers through the web to loosely interlace the fibers of the web into a stable, but loosely compacted body with substantially continuous channels extending through the web-like body, depositing a thermo-responsive resinous binder in dry powdered form on the surface of the web for infiltration into the body of said web, effecting the infiltration of the powdered binder through said body by causing it to enter said channels, and treating the fibers to render the surfaces thereof adhesive to attach the binder particles thereto and prevent loss of binder during handling and manipulation of the composition prior to molding.

ARCHIE W. KOON.